United States Patent
Akuzawa et al.

(10) Patent No.: US 9,623,735 B2
(45) Date of Patent: Apr. 18, 2017

(54) PANEL BODY OF SUNROOF DEVICE AND METHOD FOR PRODUCING PANEL BODY OF SUNROOF DEVICE

(71) Applicant: Yachiyo Industry Co., Ltd., Sayama-shi, Saitama (JP)

(72) Inventors: Masanori Akuzawa, Tochigi (JP); Hiroyuki Tsukamoto, Tochigi (JP)

(73) Assignee: YACHIYO INDUSTRY CO., LTD., Sayama-Shi (JP)

( * ) Notice: Subject to any disclaimer, the term of this patent is extended or adjusted under 35 U.S.C. 154(b) by 0 days.

(21) Appl. No.: 14/904,992

(22) PCT Filed: Jan. 19, 2015

(86) PCT No.: PCT/JP2015/051231
§ 371 (c)(1),
(2) Date: Jan. 14, 2016

(87) PCT Pub. No.: WO2015/115230
PCT Pub. Date: Aug. 6, 2015

(65) Prior Publication Data
US 2016/0185195 A1    Jun. 30, 2016

(30) Foreign Application Priority Data

Jan. 28, 2014 (JP) ................... 2014-013731

(51) Int. Cl.
*B60J 7/00* (2006.01)
*B60J 7/02* (2006.01)
(Continued)

(52) U.S. Cl.
CPC ......... *B60J 7/022* (2013.01); *B29C 45/14065* (2013.01); *B29C 45/14434* (2013.01);
(Continued)

(58) Field of Classification Search
CPC .... B60J 7/022; B62D 65/06; B29C 45/14065; B29C 45/14467
(Continued)

(56) References Cited

U.S. PATENT DOCUMENTS

| 5,344,603 | A | 9/1994 | Jardin et al. |
| 7,404,598 | B2 | 7/2008 | Huebner et al. |
| 8,668,256 | B2 * | 3/2014 | De Bie ............ B29C 45/14836 296/216.09 |

FOREIGN PATENT DOCUMENTS

| JP | 5-50887 | 3/1993 |
| JP | 10-86674 | 4/1998 |

OTHER PUBLICATIONS

International Search Report, Date of mailing: Apr. 7, 2015 (Apr. 7, 2015).

* cited by examiner

*Primary Examiner* — Dennis H Pedder
(74) *Attorney, Agent, or Firm* — Rankin, Hill & Clark LLP

(57) ABSTRACT

A panel body of a sunroof device able to have reduced weight and a method for producing the panel body. The panel body of a sunroof device includes: a sunroof panel; a holder attached to the peripheral rim of the bottom surface of the sunroof panel and provided with a concavity; a lid member occluding the opening of the concavity; and a resin holding member formed in a manner so as to integrate the sunroof panel, holder, and lid member. The panel body of a sunroof device includes the holder having flanges, an end of the lid member being sandwiched between the top surface of the flanges and the bottom surface of the sunroof panel, and the holding member having a sandwiched section entering
(Continued)

the space encircled by the top surface of the flanges, the bottom surface of the sunroof panel, and the end surface of the lid member.

2 Claims, 6 Drawing Sheets

(51) Int. Cl.
*B60J 7/04* (2006.01)
*B29C 45/14* (2006.01)
*B62D 65/06* (2006.01)
*B60J 7/043* (2006.01)
*B60J 10/82* (2016.01)
*B29K 75/00* (2006.01)
*B29K 105/20* (2006.01)
*B29L 31/30* (2006.01)

(52) U.S. Cl.
CPC ........... *B29C 45/14467* (2013.01); *B60J 7/04* (2013.01); *B60J 7/043* (2013.01); *B60J 10/82* (2016.02); *B62D 65/06* (2013.01); *B29C 45/14377* (2013.01); *B29K 2075/00* (2013.01); *B29K 2105/20* (2013.01); *B29L 2031/3005* (2013.01)

(58) Field of Classification Search
USPC ........................................ 296/216.06, 216.09
See application file for complete search history.

PANEL BODY OF SUNROOF DEVICE AND METHOD FOR PRODUCING PANEL BODY OF SUNROOF DEVICE

TECHNICAL FIELD

The present invention relates to a panel body for a sunroof device and a method for producing the panel body for the sunroof device.

BACKGROUND ART

For example, Patent Literature 1 discloses a panel body for a conventional sunroof device. FIG. 6 is a cross-sectional view of an essential portion of the conventional panel body. As illustrated in FIG. 6, the conventional panel body is mainly constituted by a sunroof panel 10, a holding member 20 formed of resin, and a holder 30. The sunroof panel 10, the holding member 20, and the holder 30 are integrally formed.

The holder 30 has a cross section with an approximately channel shape, and includes a recessed portion 34 which is formed with side portions 31 and 32 and a bottom portion 33. A filler member 35, which is formed of foamed resin, is arranged in the recessed portion 34.

In the panel body for the conventional sunroof device, the filler member 35 arranged in the recessed portion 34 functions as a spacer. Therefore, the used amount of the resin material can be reduced in comparison with the case where the entire recessed portion 34 is filled with the resin material of the holding member 20 when the sunroof panel 10, the holding member 20, and the holder 30 are integrally formed.

CITATION LIST

Patent Literature

Patent Literature 1: Japanese Patent Laid-open No. H10-86674 (1998-86674)

SUMMARY OF INVENTION

Technical Problem

However, the conventional panel body has a structure in which the resin material of the holding member 20 enters into the side portions 35a and 35b of the filler member 35 in the recessed portion 34. Therefore, the total weight of the panel body is increased by the weight of the holding member 20 intruding into the side portions 35a and 35b and the weight of the filler member 35 arranged in the recessed portion 34.

The present invention has been made in order to solve the above problem. An object of the present invention is to provide a panel body for a sunroof device which enables weight reduction, and another object of the present invention is to provide a method for producing the panel body for the sunroof device.

Solution to Problem

In order to solve the aforementioned problem, a panel body for a sunroof device according to the present invention includes: a sunroof panel; a holder being attached to a peripheral portion of a lower surface of the sunroof panel, and including a recessed portion; a lid member closing an opening of the recessed portion; and a holding member formed of resin so as to integrate the sunroof panel, the holder, and the lid member. In the panel body: the holder includes a flange portion; an end portion of the lid member is sandwiched between an upper surface of the flange portion and a lower surface of the sunroof panel; the holding member includes a sandwiched portion which enters a space surrounded by the upper surface of the flange portion, the lower surface of the sunroof panel, and an edge face of the lid member, the lid member is arranged across a pair of opening edges of the recessed portion to close the recessed portion; and the sandwiched portion is formed on each of opposite sides of the lid member bestriding the recessed portion.

According to the above structure, since the recessed portion arranged in the holder is closed by the lid member, resin material does not intrude into the recessed portion when the sunroof panel, the holder, the lid member, and the holding member are integrally formed. Therefore, the used amount of the resin material can be reduced in comparison with the panel body in which resin material intrudes into the recessed portion. In addition, since no spacer such as foamed resin is arranged in the recessed portion, the weight of the panel body can be reduced.

Further, the holding member includes the sandwiched portion, which enters into the space surrounded by the upper surface of the flange portion, the lower surface of the sunroof panel, and the edge face of the lid member. Therefore, the contact area of the holding member with the sunroof panel and the contact area of the holding member with the holder can be increased. Thus, the respective members can be rigidly held.

In addition, the lid member is arranged across a pair of opening edges of the recessed portion to close the recessed portion, and the sandwiched portion be formed on each of opposite sides of the lid member bestriding the recessed portion. Thus, intrusion of resin material into the recessed portion during the integral formation can be prevented with high reliability.

In addition, according to the present invention, a method for producing a panel body for a sunroof device is provided: where the panel body includes a sunroof panel, a holder being attached to a peripheral portion of a lower surface of the sunroof panel and including a recessed portion, a lid member closing an opening of the recessed portion, and a holding member formed of resin so as to integrate the sunroof panel, the holder, and the lid member; the holder includes a flange portion; an end portion of the lid member is sandwiched between an upper surface of the flange portion and a lower surface of the sunroof panel; and the and holding member includes a sandwiched portion which enters a space surrounded by the upper surface of the flange portion, the lower surface of the sunroof panel, and an edge face of the lid member, and the lid member is arranged across a pair of opening edges of the recessed portion to close the recessed portion; and the sandwiched portion is formed on each of opposite sides of the lid member bestriding the recessed portion.

The method is characterized in including: a step of closing the opening of the recessed portion with the lid member, and arranging the sunroof panel, the holder, and the lid member in a forming die; and a step of integrally forming the holding member to hold the sunroof panel, the holder, and the lid member while forming the sandwiched portion, by injecting resin material into the forming die.

According to the above method, the sunroof panel, the holder, the lid member, and the holding member are integrally formed, and the opening of the recessed portion is closed during the integral formation. Therefore, the resin material which forms the holding member does not intrude into the recessed portion during the integral formation. Since the amount of the resin material which forms the holding member can be reduced and no spacer such as foamed resin is arranged in the recessed portion, the weight of the panel body can be reduced.

Further, since the holding member includes a sandwiched portion which enters into the space surrounded by the upper surface of the flange portion, the lower surface of the sunroof panel, and the edge face of the lid member, the contact area of the holding member with the sunroof panel and the contact area of the holding member with the holder can be increased. Thus, the respective members can be rigidly held.

In addition, the lid member is arranged across a pair of opening edges of the recessed portion to close the recessed portion, and the sandwiched portion be formed on each of opposite sides of the lid member bestriding the recessed portion. Thus, intrusion of resin material into the recessed portion during the integral formation can be prevented with high reliability.

Advantageous Effect of Invention

The panel body for a sunroof device or the method for producing the panel body for the sunroof device according to the present invention enables weight reduction.

DESCRIPTION OF EMBODIMENT

Hereinbelow, an embodiment of a sunroof device to which a panel body for a sunroof device according to the present invention is applied is explained in detail with respect to drawings. In the following explanations, the "front-rear" and "right-left" directions are based on the directions indicated in FIGS. 1 and 2. Although a structure on the front side of the sunroof device is taken as an example in the present embodiment, it is not intended to limit the portion to which the present invention is applied.

Figure 1:
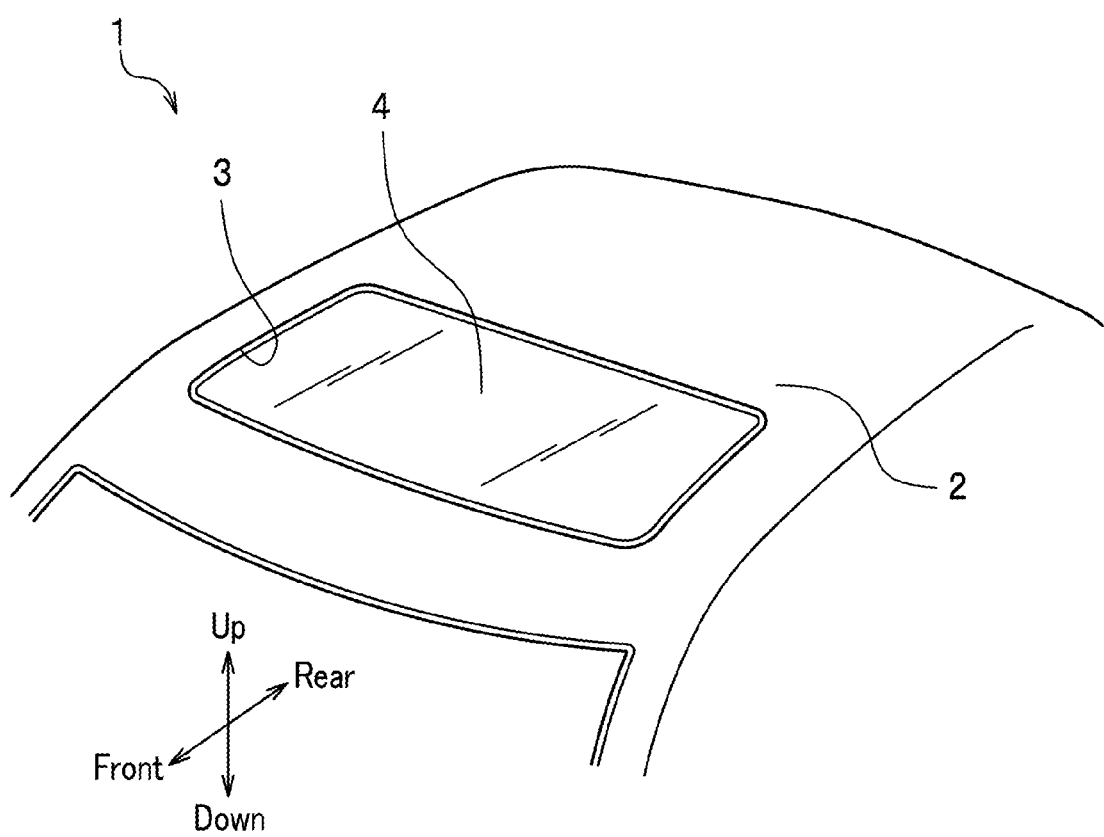
FIG. 1 is a perspective view of an essential portion of a vehicle body provided with a sunroof device to which a panel body according to an embodiment of the present invention is applied.

In FIG. 1, the sunroof device 1 includes a panel body 4. The panel body 4 is fitted to an opening 3, and is openable and closable. The opening 3 is formed in a fixed roof 2 of a vehicle. The panel body 4 can be slid rearward for opening, for example, by tilt-up or tilt-down.

Figure 2:
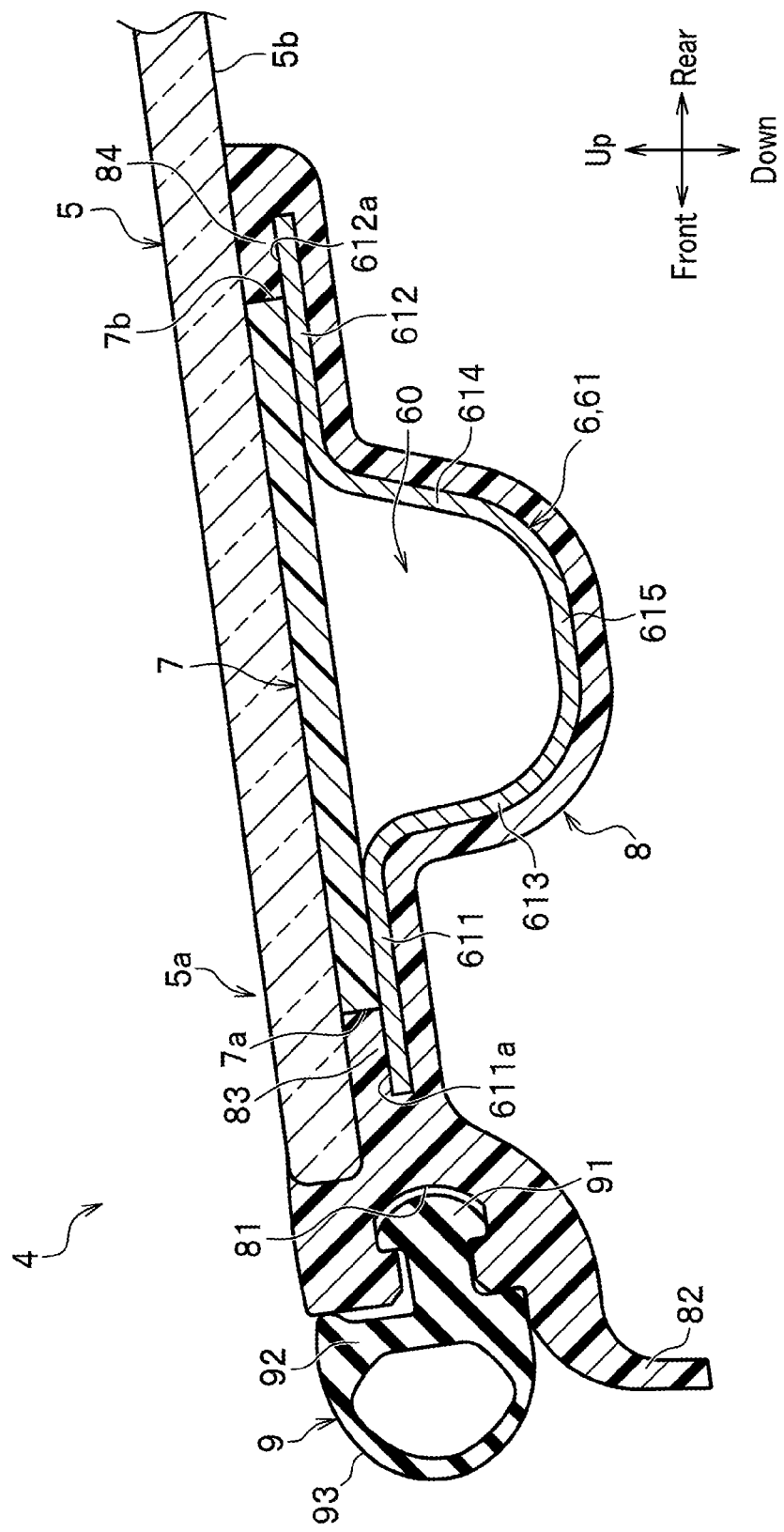
FIG. 2 is a cross-sectional view of an end portion of the panel body.

As illustrated in FIG. 2, the panel body 4 is constituted by a sunroof panel 5, a holder 6, a lid member 7, a holding member 8, and an opening-abutting member 9.

Figure 3:
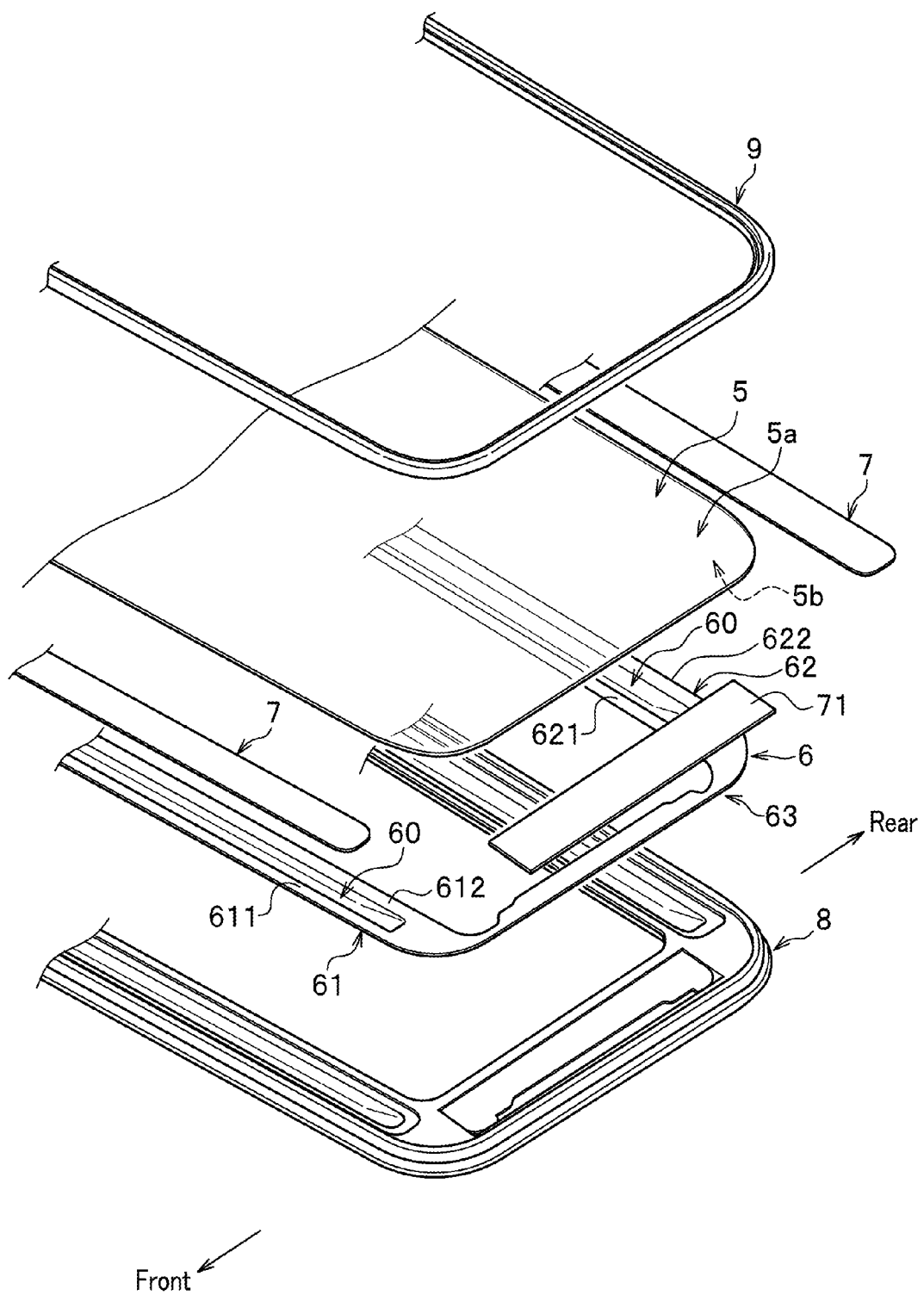
FIG. 3 is an exploded perspective view of an essential portion of the panel body.

The sunroof panel 5 is formed of glass, hard resin (such as acrylic resin or polycarbonate resin), steel plate, or the like. The holder 6 is arranged along a peripheral portion 5a of a lower face 5b of the sunroof panel 5 (as illustrated in FIG. 3).

The holder 6 is produced by press-forming or the like of a metal plate, and functions as a reinforcing member (reinforcing frame) for the sunroof panel 5. As illustrated in FIG. 3, the holder 6 includes a front portion 61, a rear portion 62, and side portions 63 (only one of which is illustrated in FIG. 3), and is formed to have an approximately rectangular frame-like shape along the opening 3 (illustrated in FIG. 1). In addition, recessed portions 60, which are recessed downward, are arranged in the front portion 61 and the rear portion 62. In the present embodiment, the recessed portion 60 in the front portion 61 is formed to have a slightly different shape from the recessed portion 60 in the rear portion 62. Alternatively, the recessed portions 60 in the front portion 61 and the rear portion 62 may be formed to have an identical shape. Although the side portions 63 are formed to have a shape of a flat plate in the present embodiment, the side portions 63 may also be formed to have a recessed portion 60 as in the front portion 61 and the rear portion 62.

As illustrated in FIG. 2, the front portion 61 includes front and rear flange portions 611 and 612, inclined portions 613 and 614, and a bottom portion 615, where the inclined portions 613 and 614 and the bottom portion 615 constitute the recessed portion 60.

The flange portions 611 and 612 are arranged spaced apart in the front-rear direction of the lower face 5b of the sunroof panel 5, and have flat faces facing the lower face 5b. The lid member 7 is arranged between the lower face 5b of the sunroof panel 5 and the flange portions 611 and 612.

The inclined portions 613 and 614 are inclined to become closer to each other as the distance to the bottom portion 615 decreases. Therefore, the recessed portion 60 has an inverted trapezoidal shape in cross-sectional view.

The entire lower face of the front portion 61 is covered by the holding member 8, so that exposure of the front portion 61 to the inside of the vehicle interior is prevented. Similarly, although the cross section is not shown, the entire lower face of each of the rear portion 62 (illustrated in FIG. 3) and the side portions 63 (illustrated in FIG. 3) is also covered by the holding member 8, so that exposure of the rear portion 62 and the side portions 63 to the inside of the vehicle interior is prevented.

The lid member 7 is realized by a resin member, for example, a foamed-resin member, and has a shape of an approximately rectangular plate as illustrated in FIG. 3. It is preferable that the lid member 7 be appropriately selected from lightweight materials. As illustrated in FIG. 2, the lid member 7 is arranged across the pair of flange portions 611 and 612 (which constitute edges of the opening of the recessed portion 60), and is held between the lower face 5b of the sunroof panel 5 and the flange portions 611 and 612. Thus, the opening of the recessed portion 60 is closed by the lid member 7.

Similarly, also in the rear portion 62, as illustrated in FIG. 3, the lid member 7 is arranged across flange portions 621 and 622, which constitute edges of the opening of the recessed portion 60.

Further, also in the side portions 63, a lid member 71 is arranged according to the present embodiment. The lid member 71 is formed to have a greater width than the side portions 63, and functions as a spacer.

As illustrated in FIG. 2, the holding member 8 is arranged to hold the sunroof panel 5, the holder 6, and the lid member 7 in such a manner that the holding member 8 wraps the holder 6 at the peripheral portion 5a of the sunroof panel 5 and protrudes in part to the edge of the peripheral portion 5a. The sunroof panel 5, the holder 6, the lid member 7, and the holding member 8 are integrally formed. The holding member 8 is formed of, for example, polyurethane or the like. An engagement groove 81, which is open to the front side, is formed in the front end portion of the holding member 8. An engagement protrusion 91 in the opening-abutting member 9 is engaged with the engagement groove 81.

A drain lip 82 is arranged at the lower end of the front portion of the holding member 8. The drain lip 82 has a tongue-like cross section, curves toward a lower front direction, and extends to form an arc-like shape. The drain lip 82 is provided for preventing dripping of liquid such as rain water into the interior of the vehicle, and causes draining of liquid such as rain water into a drainage groove (not shown) arranged on the opening 3 side of the fixed roof 2 (illustrated in FIG. 1).

In addition, sandwiched portions 83 and 84, which are sandwiched between the sunroof panel 5 and the holder 6, are formed in the holding member 8. The sandwiched portion 83 is formed by intrusion of resin material into the space surrounded by the lower face 5b of the sunroof panel 5, a front edge face 7a of the lid member 7, and an upper face 611a of the front end of the flange portion 611. On the other hand, the sandwiched portion 84 is formed by intrusion of resin material into the space surrounded by the lower face 5b of the sunroof panel 5, a rear edge face 7b of the lid member 7, and an upper face 612a of the rear end of the flange portion 612.

The opening-abutting member 9 seals between the sunroof panel 5 and an inner peripheral edge of the opening 3 of the fixed roof 2. The opening-abutting member 9 prevents intrusion of rain water or the like into the interior of the vehicle by being in contact with the inner peripheral edge of the opening 3.

The opening-abutting member 9 includes a base portion 92 and an abutting portion 93. The engagement protrusion 91 is formed in the base portion 92, and the abutting portion 93 is formed to have a hollow such that the abutting portion 93 can relatively easily collapse. The opening-abutting member 9 is formed of a material having elasticity, e.g., EPDM, and has a uniform cross sectional shape (as illustrated in FIG. 3).

Next, a method for producing the panel body 4 is explained with reference mainly to FIGS. 4 and 5. In the present embodiment, a lower fixed die 100, a movable upper die 102, and side dies 103 are used as forming dies.

First, the sunroof panel 5 is brought into an upside-down position, so that the lower face 5b faces upward. In addition, the lid members 7 and 71 are placed at predetermined positions on the peripheral portion 5a. In this case, the lid members 7 and 71 are held at predetermined positions on the lower face 5b by using an adhesive or the like. Thereafter, the surface of the sunroof panel 5 is cleaned with a degreasing agent, and a film treatment or the like realizing a function as a primer for the holding member 8 is performed on the sunroof panel 5. Similarly, the holder 6 is also cleaned, and a film treatment or the like is also performed on the holder 6.

Figure 4:
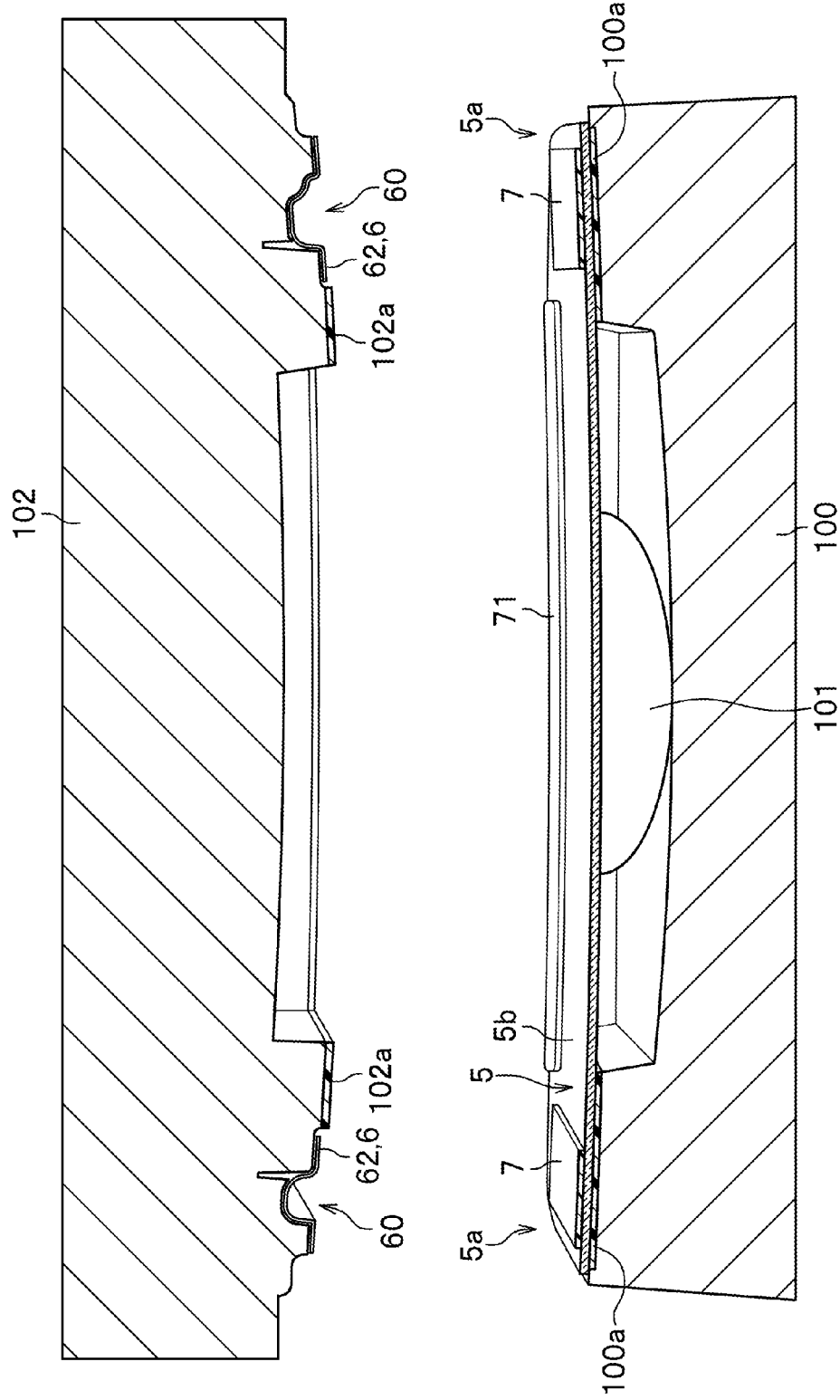
FIG. 4 is a cross-sectional view illustrating a situation in which a holder is supported by an upper die and a situation in which a sunroof panel is supported by a lower die.

Subsequently, as illustrated in FIG. 4, the sunroof panel 5, which is still held in the upside-down position, is placed on the upper side of the lower fixed die 100 by a robot or the like. Then, the sunroof panel 5 is fixed to the lower fixed die 100 by using a vacuum device 101. (These operations constitute the aforementioned step of arranging in a forming die.) At this time, positioning of the sunroof panel 5 on the lower fixed die 100 is performed by using sensors (not shown) arranged on the robot, jigs, and the like. Further, a contact-face portion of the lower fixed die 100 which is in contact with the sunroof panel 5 is a resin mold 100a.

On the other hand, the holder 6, which is brought into an upside-down position, is set by a robot or the like on a lower side of the movable upper die 102, and held on the movable upper die 102 by using slide pins (not shown) and the like. (These operations constitute the aforementioned step of arranging in a forming die.) In addition, a contact-face portion of the movable upper die 102 which is in contact with the sunroof panel 5 is a resin mold 102a.

Figure 5:
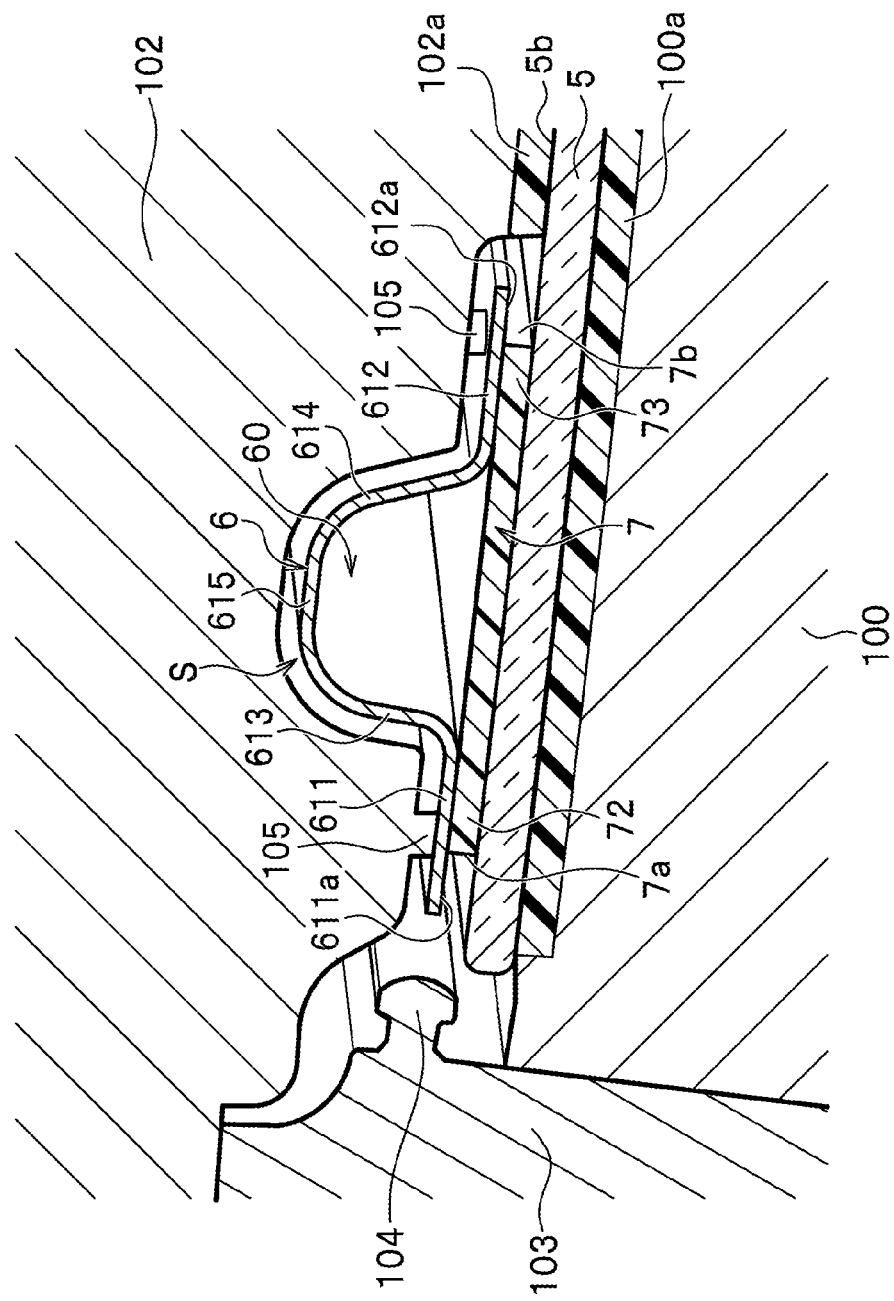
FIG. 5 is a perspective cross-sectional view of an essential portion illustrating a situation in which the forming dies are combined.
Figure 6:
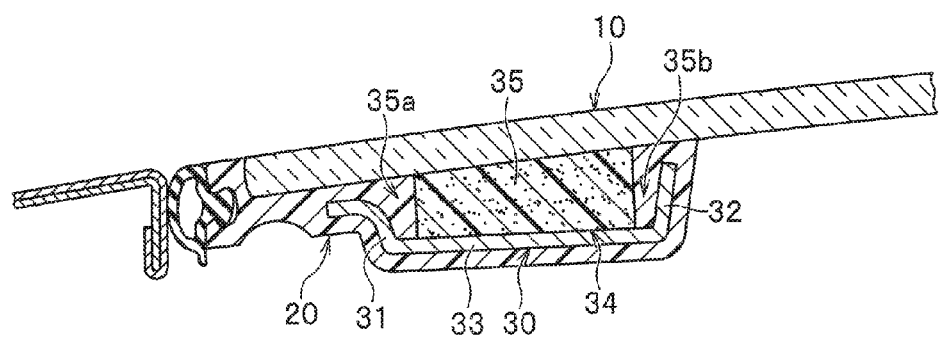
FIG. 6 is a cross-sectional view of an essential portion of a conventional panel body.

Thereafter, as illustrated in FIG. 5, the side dies 103 are slid to predetermined positions with respect to the lower fixed die 100, and the movable upper die 102 is lowered toward the lower fixed die 100 to a predetermined position. Then, the forming dies are clamped. Protrusions 104 are formed in the portions, corresponding to the engagement groove 81, of the side dies 103 (illustrated in FIG. 2).

When the forming dies are clamped, as illustrated in FIG. 5, the flange portion 611 of the holder 6 comes into contact with a front edge 72 of the lid member 7, and the flange portion 612 of the holder 6 comes into contact with a rear edge 73 of the lid member 7. Thus, the recessed portion 60 of the holder 6 is closed by the lid member 7.

A plurality of pressing pins 105 are formed at the positions, opposed to the flange portions 611 and 612, of the movable upper die 102. The pressing pins 105 are formed at predetermined intervals along the direction in which the holder 6 is extended. The pressing pins 105 abut and press the flange portions 611 and 612. Thus, the state in which the flange portions 611 and 612 abut the lid member 7 is suitably maintained. In addition, the gap S between the lower side of the holder 6 (which is illustrated on the upper side in FIG. 5) and the inner side of the movable upper die 102 is maintained by the pressing pins 105.

Thereafter, the gap between the forming dies is filled with resin material for forming the holding member 8 (illustrated in FIG. 2) by injecting molten resin material into the gap with injection pressure through a gate (not shown) arranged, for example, in the movable upper die 102. (This operation corresponds to the aforementioned step of integrally forming.) In the present embodiment, polyurethane RIM molding is used. Alternatively, other forming techniques may be used as long as the gap between the forming dies can be filled with resin material. After that, when the resin material is completely solidified by cooling after the filling, the forming dies are removed, so that the panel body 4 which is integrally formed with the holding member 8 as illustrated in FIG. 2 is obtained.

In the panel body 4 formed as above, the resin material which forms the holding member 8 does not intrude into the recessed portion 60 during the integral formation since the recessed portion 60 arranged in the holder 6 is closed by the lid member 7. Therefore, the amount of the material used for forming the holding member 8 and the weight of the panel body 4 can be reduced. In addition, in the present embodiment, foamed resin or the like is not arranged in the recessed portion 60 as in the conventional panel body. Therefore, the weight of the panel body 4 can be further reduced.

Further, since the lid member 7 is arranged across the flange portions 611 and 612 (which realize the pair of opening edges of the recessed portion 60), and the recessed portion 60 is closed during the integral formation with the holding member 8, intrusion of the resin material (which forms the holding member 8) into the recessed portion 60 can be prevented with high reliability.

Furthermore, the sandwiched portions 83 and 84, which are sandwiched by the sunroof panel 5 and the holder 6, are arranged in the present embodiment. In other words, the sandwiched portions 83 and 84 are arranged in the holding member 8 so as to cover the upper surface of the holder 6 as well as the lower and side surfaces of the holder 6. Therefore, the contact area of the holding member 8 with the sunroof panel 5 and the holder 6 can be increased, and thus the respective members can be more rigidly held.

Moreover, in the production method according to the present embodiment, the sunroof panel 5, the holder 6, the lid member 7, and the holding member 8 are integrally formed while the opening in the recessed portion 60 is closed by the lid member 7. Therefore, the holding member 8 does not intrude into the recessed portion 60 during the integral formation. Thus, the amount of the resin material used for forming the holding member 8 and the weight of the panel body 4 can be suitably reduced.

Further, since the resin molds 100a and 102a are provided in the forming dies, it is possible to prevent the sunroof panel 5 from being damaged.

Although an embodiment of the present invention is explained above, the present invention is not limited to the above embodiment. The embodiment can be modified, for example, as explained below.

For example, the provision with the recessed portion 60 is essential for the holder 6. As long as the recessed portion 60 is closed by the lid member 7 during the forming, the holder 6 can have various cross-sectional shapes.

Further, although the illustrated recessed portion 60 continuously extends in the length direction of the front portion 61, the recessed portion 60 is not limited to the illustrated example. For example, the recessed portion 60 may be dotted along the length direction of the front portion 61, or may be formed in multiple rows in the front-rear direction.

LIST OF REFERENCE SIGNS

1: Sunroof Device
4: Panel Body
5: Sunroof Panel
5a: Peripheral Portion
5b: Lower Face
6: Holder
7: Lid Member
8: Holding member
9: Opening-abutting Member
60: Recessed Portion

The invention claimed is:

1. A panel body for a sunroof device, comprising:
a sunroof panel;
a holder being attached to a peripheral portion of a lower surface of the sunroof panel, and including a recessed portion;
a lid member closing an opening of the recessed portion; and
a holding member formed of resin so as to integrate the sunroof panel, the holder, and the lid member;
wherein the holder includes a flange portion;
an end portion of the lid member is sandwiched between an upper surface of the flange portion and a lower surface of the sunroof panel;
the holding member includes a sandwiched portion which enters a first space surrounded by the upper surface of the flange portion, the lower surface of the sunroof panel, and an edge face of the lid member;
the lid member is arranged across a pair of opening edges of the recessed portion to close the recessed portion;
the sandwiched portion is formed on each of opposite sides of the lid member bestriding the recessed portion;
an entire lower surface of the holder is covered by the holding member; and
a lower surface of the lid member and the recessed portion of the holder define an enclosed second space which is not and cannot be intruded into by the resin when the holding member is formed.

2. A method for producing a panel body for a sunroof device, where the panel body includes a sunroof panel, a holder being attached to a peripheral portion of a lower surface of the sunroof panel and including a recessed portion, a lid member closing an opening of the recessed portion, and a holding member formed of resin so as to integrate the sunroof panel, the holder, and the lid member; the holder includes a flange portion; an end portion of the lid member is sandwiched between an upper surface of the flange portion and a lower surface of the sunroof panel; the holding member includes a sandwiched portion which enters a first space surrounded by the upper surface of the flange portion, the lower surface of the sunroof panel, and an edge face of the lid member; the lid member is arranged across a pair of opening edges of the recessed portion to close the recessed portion; and the sandwiched portion is formed on each of opposite sides of the lid member bestriding the recessed portion; wherein
the method comprises:
a step of closing the opening of the recessed portion of the holder with the lid member, and arranging the sunroof panel, the holder, and the lid member in a forming die; and
a step of integrally forming the holding member to hold the sunroof panel, the holder, and the lid member while forming the sandwiched portion on each of the opposite sides of the lid member and covering an entire lower surface of the holder, by injecting resin material into the forming die,
wherein, in the step of closing the opening of the recessed portion of the holder, a lower surface of the lid member and the recessed portion of the holder define an enclosed second space which cannot be intruded into by the resin material, and the resin material does not intrude into the enclosed second space in the step of integrally forming the holding member.

* * * * *